No. 723,594. PATENTED MAR. 24, 1903.
P. EYERMANN.
PROCESS OF PRODUCING STEEL.
APPLICATION FILED SEPT. 11, 1901.
NO MODEL. 5 SHEETS—SHEET 3.

WITNESSES:
A. H. Davis

INVENTOR
Peter Eyermann
BY Munn & C
ATTORNEYS

No. 723,594. PATENTED MAR. 24, 1903.
P. EYERMANN.
PROCESS OF PRODUCING STEEL.
APPLICATION FILED SEPT. 11, 1901.
NO MODEL. 5 SHEETS—SHEET 4.
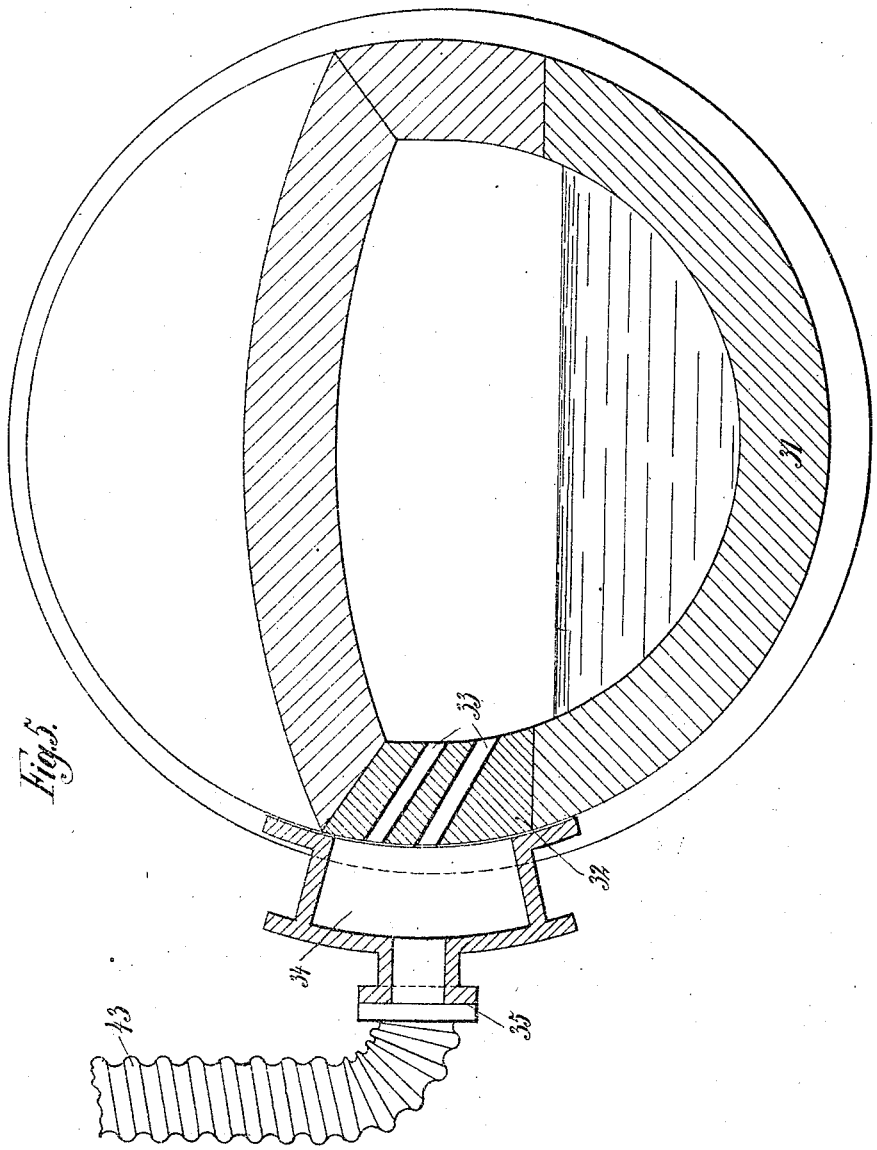
WITNESSES :
H. M. Avery
A. H. Davis
INVENTOR
Peter Eyermann
BY
ATTORNEYS.

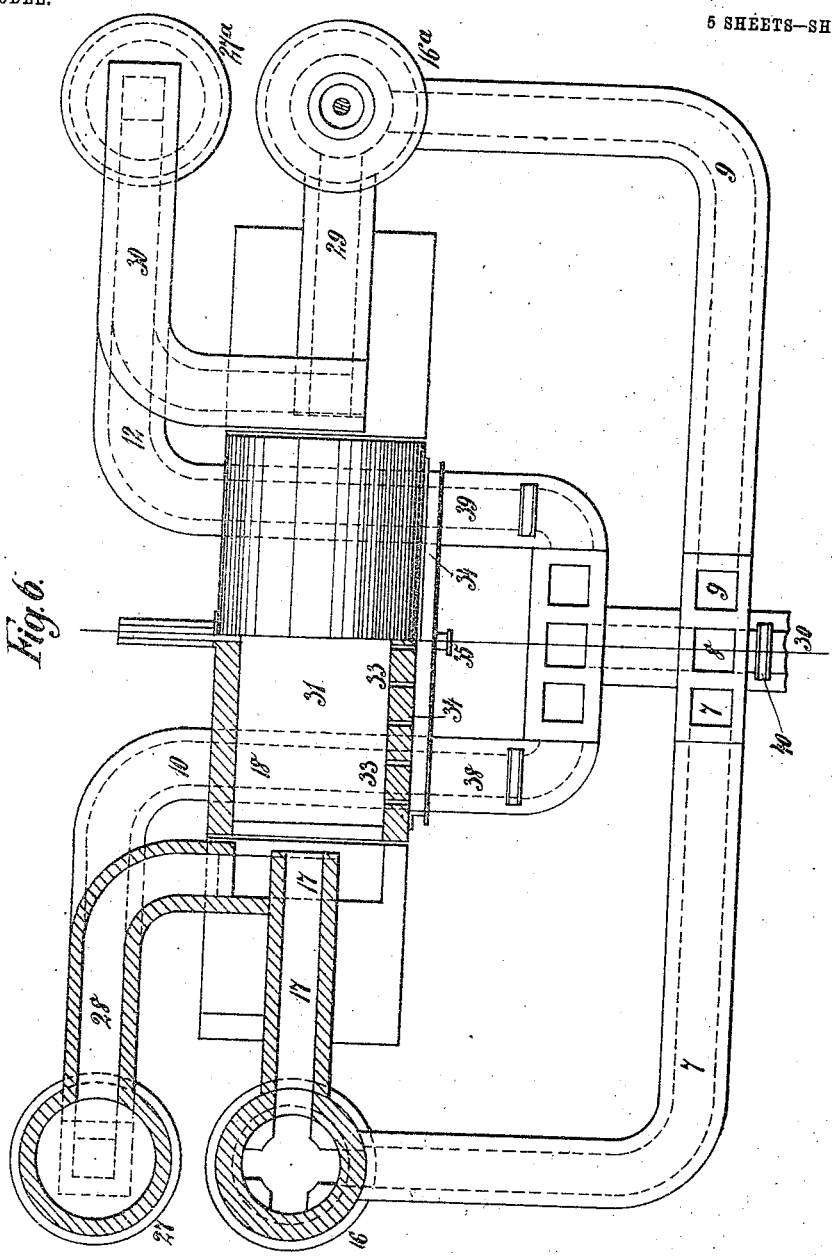

UNITED STATES PATENT OFFICE.

PETER EYERMANN, OF BENRATH, NEAR DUSSELDORF, GERMANY.

PROCESS OF PRODUCING STEEL.

SPECIFICATION forming part of Letters Patent No. 723,594, dated March 24, 1903.

Application filed September 11, 1901. Serial No. 75,066. (No specimens.)

*To all whom it may concern:*

Be it known that I, PETER EYERMANN, chief engineer, of the city of Benrath, near Dusseldorf, Germany, have invented certain new and useful Improvements in Processes for the Production of Steel by Means of Blast-Furnace Gas, of which the following is a specification.

My invention relates to a process for rapid production of iron or steel by direct heating by blast-furnace gas, a preliminary heating and improvement in the quality of the gas being effected by suitable devices.

Figure 1:
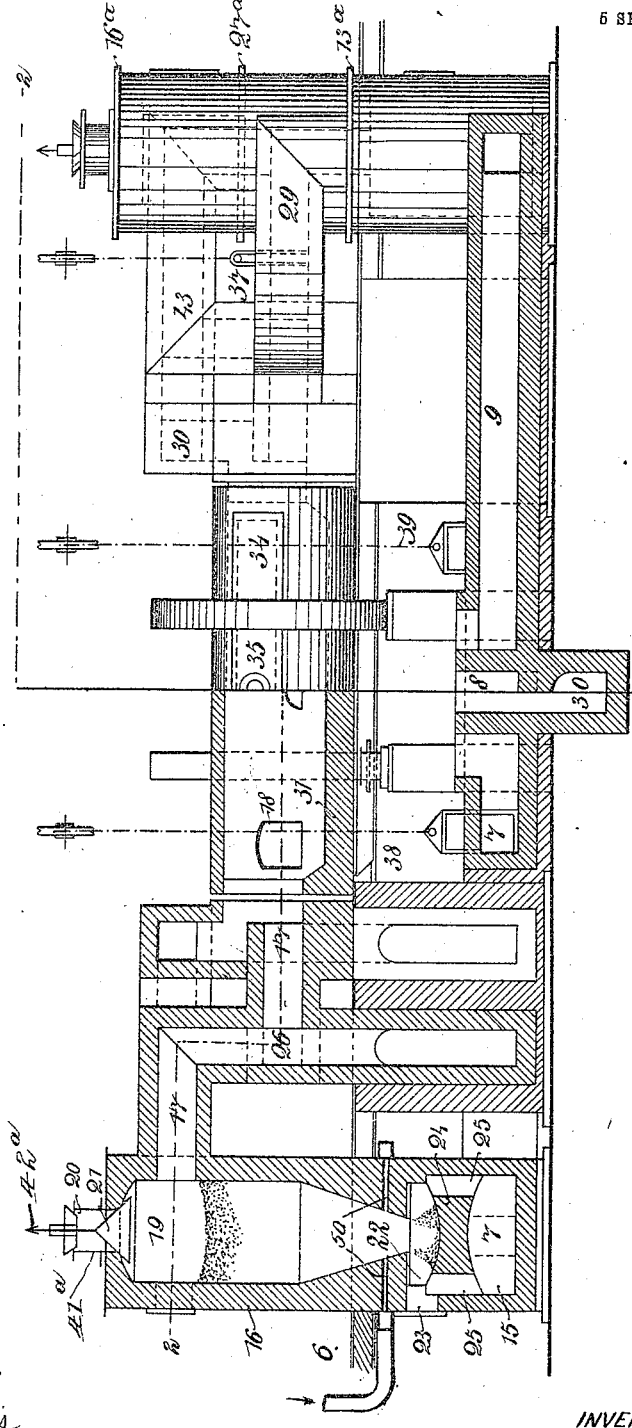
Figure 2:
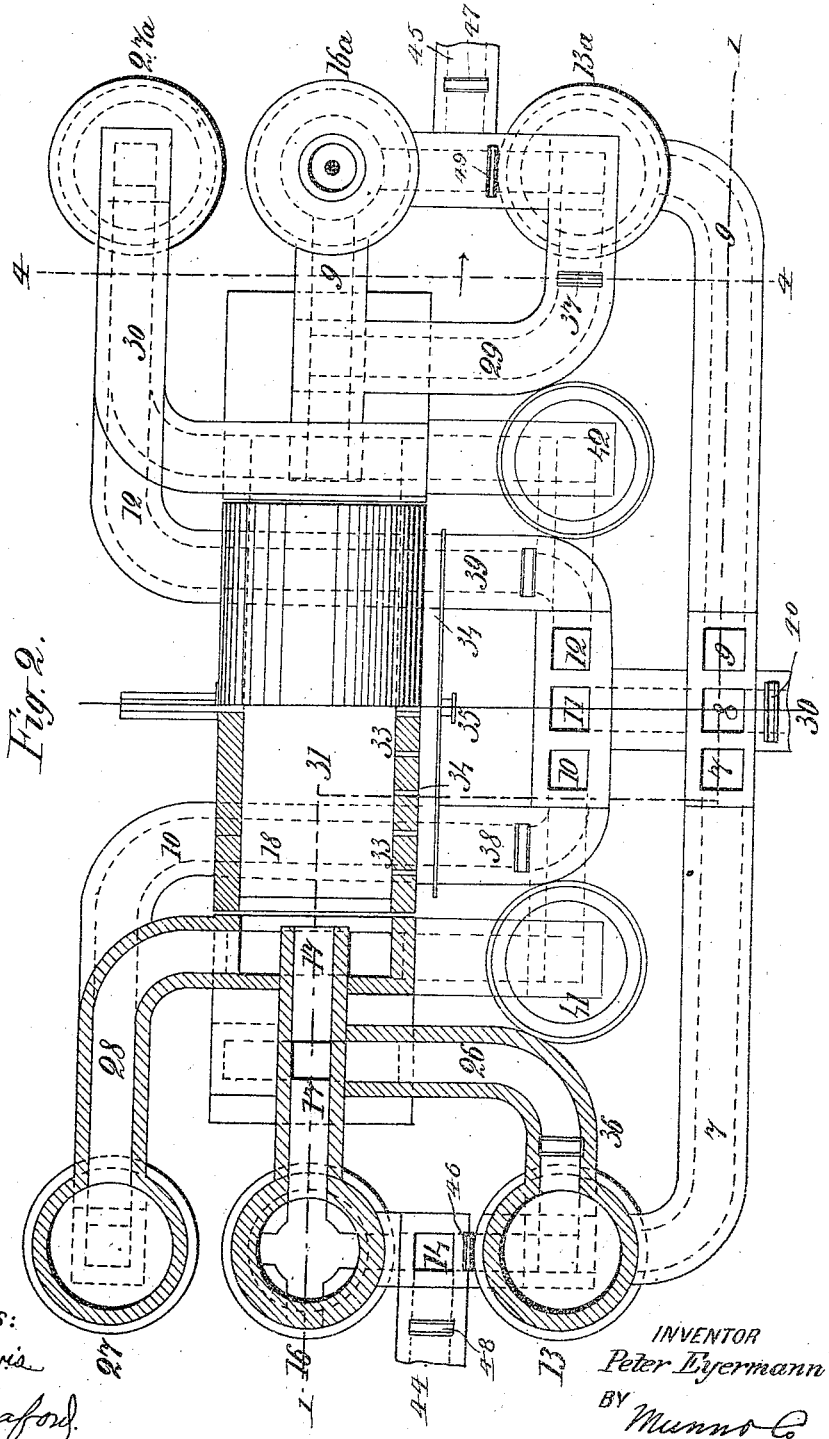
Figure 3:
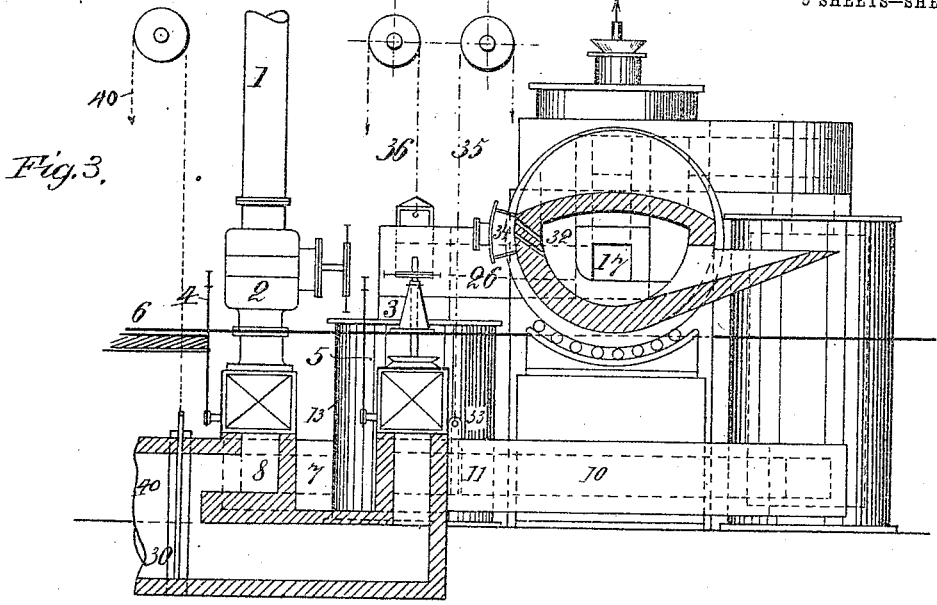
Figure 4:
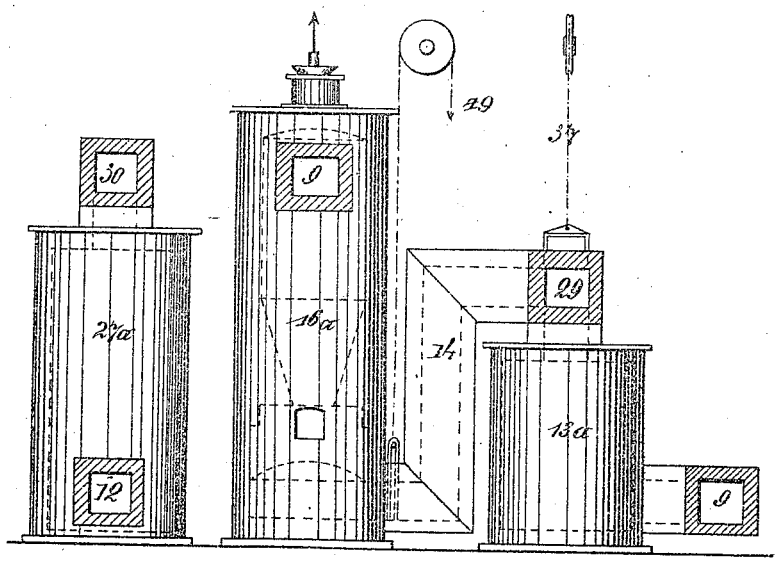

In the accompanying drawings, Figure 1 is a longitudinal section of the furnace which I employ, the section being taken on the lines 1 1 of Fig. 2. Fig. 2 is a horizontal section on lines 2 2 of Fig. 1. Fig. 3 is a central transverse section, and Fig. 4 is a transverse section on the line 4 4 of Fig. 2. Fig. 5 is a transverse section through the two hearths 31 and 32. Fig. 6 is a plan view of a modification.

Blast-furnace gas is employed for generating the heat required for working the furnace. The gas is first purified by any one of the known methods from dust and is forced by a fan under certain pressure into the supply-main, and, as in an ordinary hearth-furnace, the gas is led by a pipe 1 to a regulating-valve 2, and the air for combustion in the furnace is introduced in the usual way by a regulating-valve 3, this air being, if necessary, supplied under pressure.

The usual current-reversing devices for the gas and the air are preferably operated by levers 4 and 5 from an upper working platform 6.

From each reversing device there branch off three passages 7 8 9 and 10 11 12.
When, for instance, the blast-furnace gas enters by the passage 7, it first passes into a regenerative chamber 13, which is filled, as usual, with checker-works. Thence it flows by the passage 14 into the lower chamber 15 of a coke-tower 16, from the top of which it passes by a flue 17 to the open-hearth furnace proper, 18. The chamber 16 has three compartments. The upper compartment 19 is like an ordinary gas-producer, charged at the top with coke or coal through a double closure. The hopper 20 closes the cylinder 41ª. Through the hub of the hopper 20 extends the suspension-rod 42ª of the bell 21. By this rod 42ª the bell can be lowered and lifted from the outside. When the hopper is lifted, the coal is charged in the cylinder 41ª. When charged, the hopper is closed and the bell is lowered by the rod. The coal then falls in the producer, and the bell is again lifted for closing the cylinder. In this way no gas is lost. The bell is made of fireproof material. The middle compartment 22 has doors 23, by which the ashes that accumulate on the arch 24 can from time to time be removed. The arch 24 above the lowest compartment 15 has holes through which the gas entering below 24 passes up into the compartment 22 and thence onward through the glowing materials to the upper compartment 19.

In order to start the producer 16, air is admitted through the doors 23 to support the combustion of the ignited fuel, the holes 25 being at this time closed by covers. From the chamber 13 branches off a flue 26, which opens into the flue 17, leading to the open-hearth furnace 18. The air flows in through the flue 10 and passes through to the regenerative chamber 27, out through the flue 28, and thence to the furnace-chamber 18. The gas and air are so heated in the regenerative chambers 13 and 27 that they burn with great heat in the open-hearth furnace 18, the gaseous products of combustion escaping by the flues 29, then passing through the generative chambers 13ª and 27ª, the flues 9 and 12, and then, finally, by the reversing devices 4 and 5 to the flue 30, by which they pass into a chimney.

The open-hearth furnace 18 may be an ordinary stationary or a tilting one.

The furnace shown in the drawings is new only in the following respects: It has two hearths 31 and 32, the hearth 31 constructed as in any other open-hearth furnace. (Shown in Fig. 5.) The other hearth 32 has twyers 33, like every Bessemer converter, but directed obliquely upon the top of the bath on the hearth 31. The twyers all open outside into a receiver 34, which is supplied with hot or cold blast from the blast-furnace by a flexible tube 43, connected to 35. The tube 43 may be connected directly with the blast-pipe of the blast-furnace, in which case the blast is cold, or the blast may be taken hot from the apparatus employed to heat the same. The blast is regulated by a valve arranged in the supply-pipe. For the purpose of exactly regulating the working of the furnace there are provided five dampers—namely, 36 and 37 for the gas-flues, 38 and 39 for the air-passages, and 40 in the chimney-flue—to regulate the draft. The receiver 16, which contains carbon of any kind, can be used also at any time as a common gas-producer by means of blowing in blast from the blast-furnace through the twyers 50. Therefore four kinds of gases can be used in the furnace—first, blast-furnace gas; second, producer-gas; third, improved blast-furnace gas; fourth, improved waste gas. The air-heating chambers may also be arranged at 41 42 on the twyers side of the furnace or they may be arranged on both sides. By means of the dampers the working of the furnace may be so arranged that part of the waste gases shall pass into the gas-producer 16, through the flue 17, up into the compartment 19, causing perhaps incandescence of the fuel in 16, and thence by the flue 14 to the chimney. The $CO_2$ of this waste gas is there also changed into $2CO$, and this part of the waste again may be used for burning by means of a flue 44, which must somewhere have a communication with the other side of the furnace, as at 45. Both sides 44 and 45 in their turn also may be regulated by separated dampers 47 48. In this case the dampers 46 and 49 are necessary for regulating this process. The furnace may also be provided with only the producer 16 and the air-heating chamber 27, the gas-heating chamber 13 being dispensed with, as shown in Fig. 6.

The process in the furnace will be as follows: The liquid pig-iron coming from the blast-furnace is to be charged directly on the hearth, poor blast-furnace gas alone being used for heating the smelting-room. The iron contains different substances—as silicon, phosphorus, manganese, and carbon—the quantities of which have to be reduced to a certain degree to enable the production of steel of good quality. For accelerating this process furnace-blast is to be used in this open hearth, entering through the air-nozzles. The silicon goes in the acid slag, the phosphorus and a certain quantity of manganese in basic slag, while the carbon burns into carbonic acid. By burning the above substances so much heat is gained that the heating with poor gas will be sufficient. By imparting a slight rocking movement to the furnace fresh particles of iron are constantly brought into contact with the blast, so that this first process of fining is greatly accelerated. After a certain time of blowing for the first fining the finishing process begins, during which operation a cooling of the bath takes place. The reduction of carbon and other substances is attained by charging scrap and pure iron ores into the hearth, a high degree of heat being required for this purpose. Then the coke apparatus will be set in operation, so that poor gas of the blast-furnace passes through same. By this process this gas is highly improved, because its carbonic anhydrid is converted into carbonic oxid. By burning this improved blast-furnace gas during the finishing process a high degree of heat is attained for smelting the scrap and ores. As soon as the steel has attained the required quality it is again subjected to a high degree of heat, produced in the furnace by this improved gas. Finally the whole bath or only a part of it is tapped in the ladle by tilting the furnace.

What I claim as my invention is—

1. A process for the production of steel, which consists in charging liquid pig-iron from the blast-furnace directly upon a furnace-hearth, and heating the metal first by the combustion of poor blast-furnace gas, and finally by the combustion of improved blast-furnace gas.

2. A process for the production of steel which consists in heating the liquid pig-iron in the hearth-furnace by the combustion of poor blast-furnace gas, directing an air-blast upon the surface of the metal for effecting a preliminary refining, and finally passing blast-furnace gas through glowing carbonaceous material and burning the same in the furnace.

3. A process for the production of steel which consists in heating liquid pig-iron in a hearth-furnace by the combustion of blast-furnace gas, directing an air-blast upon the surface of the metal, and agitating the metal to bring fresh particles of the bath into contact with the air-blast, and finally passing blast-furnace gas through glowing carbonaceous material and burning the same in the furnace to produce a high degree of heat.

4. A process for the production of steel, which consists, in charging liquid pig-iron from the blast-furnace directly on the furnace-hearth, heating the metal by the combustion in the metal-containing furnace of poor gas from the blast-furnace, directing an air-blast upon the surface of the metal, agitating the metal to bring fresh particles of the bath in contact with the blast, introducing scrap and iron ore into the bath, and passing poor blast-furnace gas through glowing carbonaceous material and burning the same in the furnace to produce a high degree of heat.

In witness whereof I have hereunto signed my name in the presence of two subscribing witnesses.

PETER EYERMANN.

Witnesses:
PETER LIEBER,
WILLIAM ESSENWEIN.